G. C. HAMEL.
TROLLEY HARP.
APPLICATION FILED JULY 7, 1914.

1,202,708.

Patented Oct. 24, 1916.
2 SHEETS—SHEET 1.

Witnesses
R. M. Jones
Chas. J. Olsson

Inventor
G. C. Hamel.
By A. Randolph, Jr.
Attorney

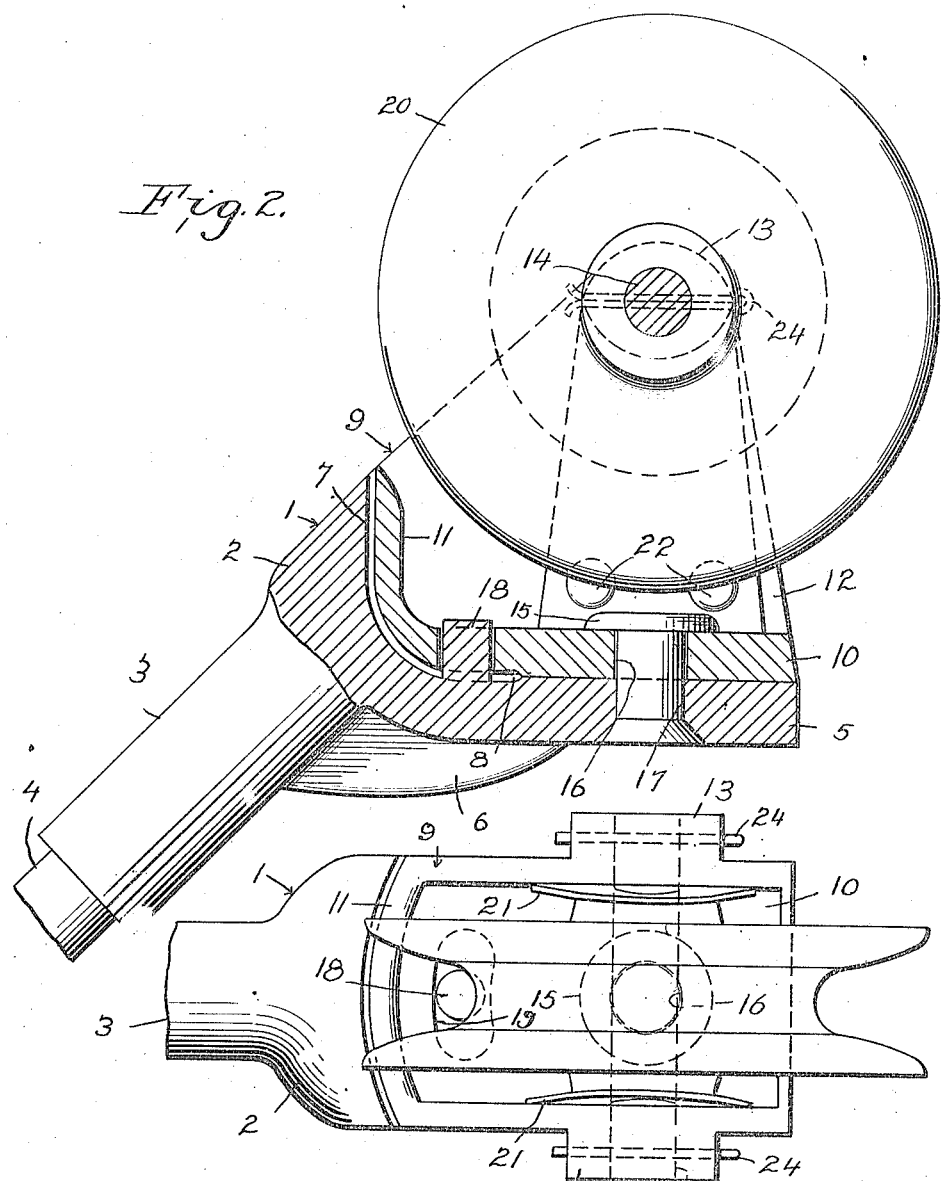

UNITED STATES PATENT OFFICE.

GEORGE C. HAMEL, OF MASSILLON, OHIO, ASSIGNOR OF ONE-HALF TO ARTHUR N. KALEY, OF MASSILLON, OHIO.

TROLLEY-HARP.

1,202,708.

Specification of Letters Patent.

Patented Oct. 24, 1916.

Application filed July 7, 1914. Serial No. 849,489.

*To all whom it may concern:*

Be it known that I, GEORGE C. HAMEL, a citizen of the United States, residing at Massillon, in the county of Stark and State of Ohio, have invented certain new and useful Improvements in Trolley-Harps; and I do hereby declare the following to be a full, clear, and exact description of the invention, such as will enable others skilled in the art to which it appertains to make and use the same.

My invention relates to new and useful improvements in trolley harps and resides in the provision of such a device so constructed that the trolley wheel will be supported in a reliable and efficient manner, permitted a swivel movement and not apt to accidentally "jump" from the trolley wire.

An important object of my invention is to provide a trolley harp of the character described which will permit a swivel movement of the trolley wheel therefore preventing the accidental displacement of the wheel relative to the trolley wire when the trolley car is rounding a curve.

A still further object is to provide a device of the character described which is extremely simple as to construction, reliable and efficient in operation and cheap to manufacture.

The above and additional objects are accomplished by such means as are illustrated in the accompanying drawings, described in the following specification, and then more particularly pointed out in the claim which is appended hereto and forms a part of this application.

Figure 1:
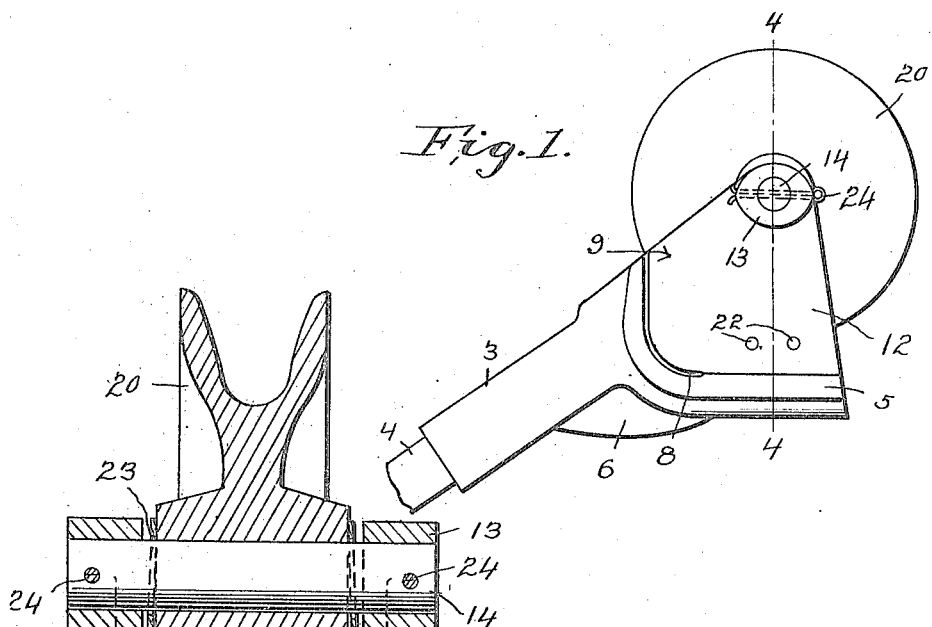
Figure 4:
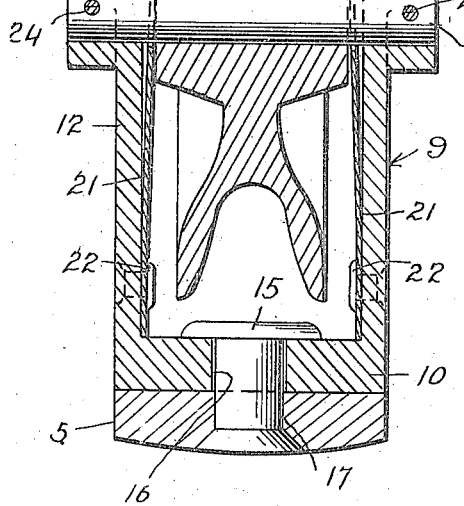
Figure 5:
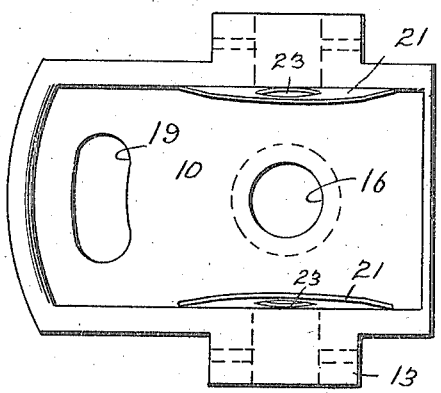

With reference to the drawings, wherein I have illustrated the preferred embodiment of my invention as it is reduced to practice, and throughout the several views of which similar reference numerals designate corresponding parts: Figure 1 is a side elevation of the device as it would appear in assembled position showing the trolley pole broken away, Fig. 2 is a vertical section taken through the harp showing the detail swivel arrangement for the harp, Fig. 3 is a top plan view, Fig. 4 is a vertical sectional view taken on line 4—4 of Fig. 1, and Fig. 5 is a detail plan view showing a portion of the harp with the other portion and wheel removed.

Referring to the drawings, 1 designates as an entirety the trolley harp which is cast in two parts. The body part 2 is provided with the usual tubular shank 3 adapted to receive the trolley pole 4. The body part 2 of the harp 1 consists of an approximately rectangular and integral plate 5 that is extended outwardly from the tubular socket or extension 3 and adapted to be disposed in an approximate horizontal plane relative to the trolley wire.

An integral reinforcing rib 6 arranged upon the under face of the plate 5 serves to reinforce the body part 2. The inner end of this plate 5 is curved upwardly as at 7 and offset upon its upper surface as at 8. The body part 2 of the harp 1 is capable of being cast in one piece as will be readily seen with reference to the foregoing description and accompanying drawings.

Mounted for swivel movement upon the plate 5 of the body part 2 is the trolley wheel supporting member of the harp 1 which is designated as an entirety by the numeral 9. This wheel supporting member 9 forming a part of the harp 1 consists of an approximately rectangular body portion 10 which is curved upwardly at one end as at 11 to conform to the curved portion 7 of the plate 5, and joined integral with the forks 12 of the wheel supporting portion 9 of the harp. These forks 12 are formed in the nature of plates and are tapered toward their upper ends at which point are formed outwardly extending apertured bosses forming bearings 13 for the trolley wheel shaft 14.

As a means for mounting the supporting member 9 for swivel movement upon the body part 2 of the harp 1 there is provided a bolt or headed pin 15 that is inserted through an opening 16 in the body portion 10 of the member 9 so that its head engages the upper face of the body portion, and through an opening 17 in the plate 5. The bolt or pin 15 is either rigidly or loosely secured in any suitable manner within or relative to the opening 17.

Formed integral adjacent the offset portion 8 of the plate 5 and centrally of the longitudinal edges of the plate is an upstanding stop pin 18 that extends through and works freely in an arcuate slot 19 formed adjacent the curved portion 11 of the body portion 10. This stop pin 18 serves to limit the swivel movement of the member 9 but permits sufficient movement of the harp member 9 when the trolley car is making a curve. All of the curved portion 11 of the harp member 9 and a part of the body portion 10 is spaced from the body part 2 of the harp 1 by reason of the offset portion 8 formed in the plate 5. Thus it will be seen that the body portion 10 has bearing engagement with a portion only of the plate 5 thus permitting free movement and preventing unnecessary friction.

Loosely mounted upon the trolley wheel shaft 14 is a trolley wheel 20 that is arranged for slight lateral movement upon the shaft. A leaf spring 21 is secured as at 22 by a bolt or other suitable fastening means upon the inner face of each of the forks of the harp member 9. These springs 21 are provided with openings 23 at their upper ends through which the shaft 14 is inserted when the device is being assembled. The upper ends of the springs 21 bear against the hub portion of the trolley wheel 20 and serve to center the wheel upon the shaft. These springs 21 also permit a yielding action to the wheel 20 when the trolley car is rounding a curve thus providing free movement and assisting in the holding of the wheel in engagement with the trolley wire. The shaft 14 is fixed within the bearings 13 by means of transverse pins 24 which are inserted through openings formed in the bearings and the shaft end.

In operation, when the trolley car rounds a curve the trolley wheel 20 is permitted to move to agree with the line of the curve owing to its swivel connection hereinbefore described.

The springs 21 permit yielding lateral adjustment of the trolley wheel 20 thus aiding generally in holding the trolley wheel against accidental removal from the trolley wire. The stop pin 18 limits the movement of the trolley wheel 20, that is the swivel movement thereof and thus serves to prevent the movement of the harp portion 9, too far since it is desirable to limit the adjustment so that the wheel is normally in the proper position relative to the trolley wire.

It will be readily seen with reference to the foregoing description and accompanying drawings that I have provided a trolley harp of a novel construction which is capable of performing all functions hereinbefore described in a reliable and expeditious manner and is cheap to manufacture because of its few number of parts and arrangement thereof.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:—

A trolley harp of the character set forth comprising a rectangular base plate having an upwardly extending concave rear wall, a downwardly extending trolley pole socket formed integrally therewith and extending therefrom, and an apertured enlargement formed on the upper face of said base plate at its forward end thereof, in combination with a trolley casing having a base, an upwardly extending concavo-convex rear wall formed integrally with the base, side walls formed integrally with and extending upwardly from the opposite sides of the base and provided with apertured bosses in the upper ends thereof, forming bearings, said side walls and rear walls reinforcing the casing, a front wall formed integrally with the forward end of the base and the front edges of the side walls for increasing the rigidity of the casing, an apertured enlargement formed on the under face of said base plate of the casing and adapted to rest on said enlargement of the first named rectangular plate thereby spacing the rear ends of said casing from the rectangular plate, a pin adapted to fit in the apertures of the base plate for rotatably mounting said casing on said base plate, said base of the casing having an arcuate slot formed therein intermediate the enlargement of the rear wall, said base plate having an upstanding pin adapted to engage the walls of said slot whereby the movement of said casing is limited in either direction, and a shaft mounted in said apertured portions, a trolley wheel rotatably mounted on the shaft.

In testimony whereof I affix my signature in presence of two witnesses.

GEORGE C. HAMEL.

Witnesses:
    ESTELLA V. SCHWARM,
    GUSTAVE BERGH.